(12) United States Patent
DiMascio et al.

(10) Patent No.: US 10,670,172 B2
(45) Date of Patent: Jun. 2, 2020

(54) LOW PERMEATION CURB PUMP HOSE

(71) Applicants: Ramon Joseph DiMascio, Cuyahoga Falls, OH (US); Andrew J. Speidel, Norfolk, NE (US)

(72) Inventors: Ramon Joseph DiMascio, Cuyahoga Falls, OH (US); Andrew J. Speidel, Norfolk, NE (US)

(73) Assignee: VEYANCE TECHNOLOGIES, INC., Fairlawn, OH (US)

( * ) Notice: Subject to any disclaimer, the term of this patent is extended or adjusted under 35 U.S.C. 154(b) by 545 days.

(21) Appl. No.: 14/590,301

(22) Filed: Jan. 6, 2015

(65) Prior Publication Data

US 2015/0198269 A1    Jul. 16, 2015

Related U.S. Application Data

(60) Provisional application No. 61/925,784, filed on Jan. 10, 2014.

(51) Int. Cl.
*F16L 11/04* (2006.01)
*F16L 11/12* (2006.01)
(Continued)

(52) U.S. Cl.
CPC .............. *F16L 11/045* (2013.01); *B32B 1/08* (2013.01); *B32B 7/12* (2013.01); *B32B 15/02* (2013.01);
(Continued)

(58) Field of Classification Search
CPC .......... F16L 11/045; F16L 11/12; F16L 11/10; F16L 11/085; F16L 2011/047; B32B 7/12;
(Continued)

(56) References Cited

U.S. PATENT DOCUMENTS 5,093,427 A * 3/1992 Barber .................. C08F 214/22
525/276
5,639,528 A  6/1997 Feit et al.
(Continued)

FOREIGN PATENT DOCUMENTS

CN   1800251 A    7/2006
DE   60303542 T2  11/2006
(Continued)

OTHER PUBLICATIONS

JP 2003268179 A, machine translation, 2003, p. 1-15, accessed Nov. 4, 2017.*
(Continued)

*Primary Examiner* — Gerard Higgins
*Assistant Examiner* — Kevin C Ortman, Jr.
(74) *Attorney, Agent, or Firm* — Alvin Rockhill

(57) ABSTRACT

The subject invention discloses a low permeation curb pump hose comprising: (a) a tube layer, wherein the tube layer is comprised of a first nitrile rubber; (b) a barrier layer which is situated over the tube layer, wherein the barrier layer is comprised of a fluorothermoplastic; (c) a friction layer which is situated over the barrier layer, wherein the friction layer is comprised of a second nitrile rubber; (d) a reinforcement layer which is situated over the friction layer, wherein the reinforcement layer is comprised of braided steel wire, wherein the braided steel wire has a wire pack coverage of about 30 percent to about 60 percent; and (e) a cover layer which is situated over the reinforcing layer, wherein the cover layer is comprised of a chlorinated polyethylene.

16 Claims, 2 Drawing Sheets

(51) Int. Cl.
*F16L 11/10* (2006.01)
*F16L 11/08* (2006.01)
*B32B 1/08* (2006.01)
*B32B 15/02* (2006.01)
*B32B 15/06* (2006.01)
*B32B 7/12* (2006.01)
*B32B 15/085* (2006.01)
*B32B 25/08* (2006.01)

(52) U.S. Cl.
CPC ............ *B32B 15/06* (2013.01); *B32B 15/085* (2013.01); *B32B 25/08* (2013.01); *F16L 11/085* (2013.01); *F16L 11/10* (2013.01); *F16L 11/12* (2013.01); *B32B 2307/704* (2013.01); *B32B 2307/7265* (2013.01); *B32B 2597/00* (2013.01); *F16L 2011/047* (2013.01)

(58) Field of Classification Search
CPC ....... B32B 15/02; B32B 15/06; B32B 15/085; B32B 25/08; B32B 1/08; B32B 2307/704; B32B 2597/00; B32B 2307/7265
USPC .... 428/412, 36.8, 460; 525/329.3, 190, 221, 525/199, 212, 234, 55, 70, 71; 138/137
See application file for complete search history.

(56) References Cited

U.S. PATENT DOCUMENTS

| | | | |
|---|---|---|---|
| 5,679,425 A | 10/1997 | Plumley | |
| 6,270,901 B1 * | 8/2001 | Parsonage | B32B 7/10 428/421 |
| 6,451,925 B2 | 9/2002 | Jing | 525/340 |
| 6,482,522 B1 | 11/2002 | Parsonage et al. | 428/421 |
| 6,489,420 B1 * | 12/2002 | Duchesne | C08F 214/184 526/247 |
| 6,686,012 B1 | 2/2004 | Molnar et al. | 428/36.91 |
| 2006/0127619 A1 * | 6/2006 | Dimascio | B32B 1/08 428/36.91 |
| 2006/0151043 A1 * | 7/2006 | Nanney | B32B 1/08 138/125 |
| 2008/0057248 A1 | 3/2008 | Hatchett | |

FOREIGN PATENT DOCUMENTS

| | | |
|---|---|---|
| EP | 0739712 B1 | 10/1996 |
| EP | 0999394 A1 | 5/2000 |
| EP | 1496298 A2 | 1/2005 |
| JP | HEI07-266501 | 10/1995 |
| JP | 2001-205745 A | 7/2001 |
| JP | 2003268179 A * | 9/2003 |
| JP | 2004501991 | 1/2004 |
| JP | 2005-188729 A | 7/2005 |
| JP | 2007-112916 A | 5/2007 |
| JP | 2008232429 A | 10/2008 |
| JP | 2009-236258 A | 10/2009 |
| WO | WO 95/13186 A1 | 5/1995 |
| WO | WO 99/61227 A1 | 12/1999 |
| WO | 2002000741 A1 | 1/2002 |
| WO | 030225663 A1 | 3/2003 |
| WO | WO 2004/037591 A2 | 5/2004 |
| WO | 2007/021782 A | 2/2007 |
| WO | WO 2007/026135 A1 | 3/2007 ............ B65G 43/02 |
| WO | 2013/089200 A1 | 6/2013 |

OTHER PUBLICATIONS

European Search Report, EP 14 198 804.8-1758.
Japanese Office Action dated Sep. 2, 2019.

* cited by examiner

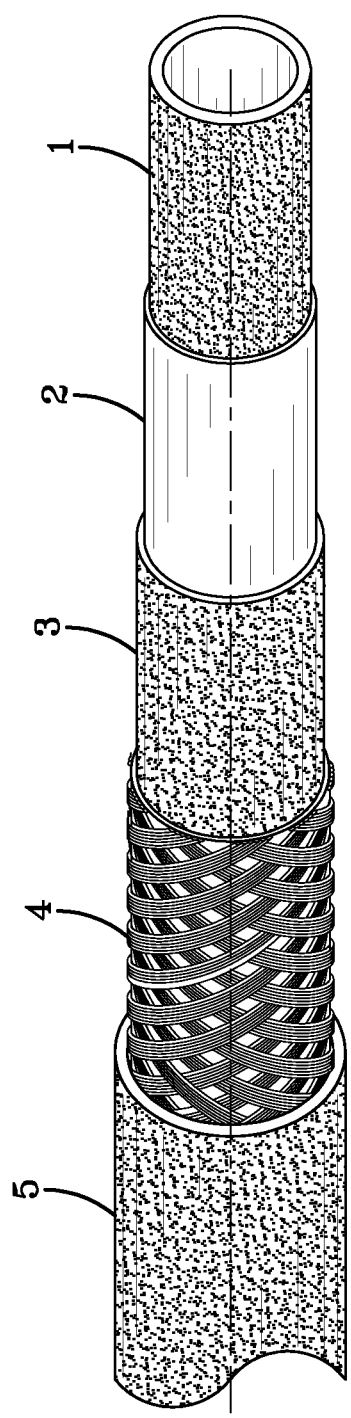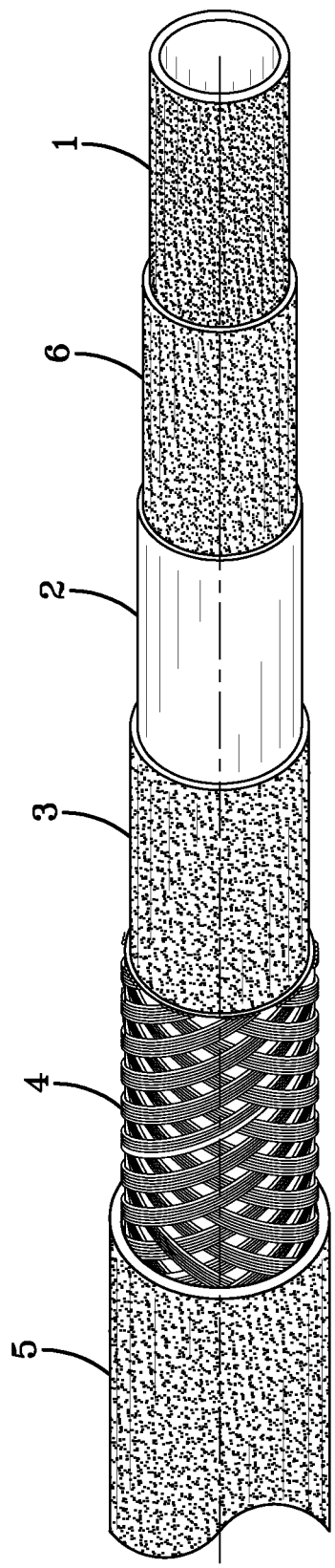

LOW PERMEATION CURB PUMP HOSE

This application claims the benefit of U.S. Provisional Patent Application Ser. No. 61/925,784, filed on Jan. 10, 2014. The teachings of U.S. Provisional Patent Application Ser. No. 61/925,784 are incorporated herein by reference in their entirety.

FIELD OF THE INVENTION

The present invention is directed to a hose suitable for use in the conveyance of fuels such as gasoline, gasohol, diesel, and biodiesel. These hoses are of particular value for use in conjunction with both conventional and vapor recovery fuel dispensing pumps, such as those used for fueling automobiles and trucks.

BACKGROUND OF THE INVENTION

A wide array of performance demands are put on the hoses used on fuel pumps, such as those used at gasoline filling stations and truck stops. For instance, such hoses must be strong, durable, flexible, resistant to organic solvents, resistant to volumetric expansion, offer a long service life, and have low permeability to gasoline. Such fuel hoses must also be capable of being coupled to fittings in a manner that prevents fuel from escaping.

There is currently a demand to further improve such hoses to make them even less permeable to fuels, such as gasoline, gasohol (gasoline which contains a significant amount of ethyl alcohol such as 10 percent or more), diesel, and biodiesel. This is because the fuel which migrates through the hose ultimately evaporates and escapes into the atmosphere which is an environmental concern. Accordingly, such hoses must comply with various standards imposed by the Environmental Protection Agency, the California Air Resources Board, and a host of other governmental authorities. However, improving the resistance of such hoses to permeation by fuel and particularly gasohol without compromising the needed physical and chemical characteristics of the hose has proven to be an extremely difficult task.

SUMMARY OF THE INVENTION

The curb pump hose (fuel hose) of this invention offers an extremely high level of resistance to permeation by gasoline and gasohol (less than 10 grams/m$^2$/day). This is achieved without compromising other important characteristics of the hose, such as strength, durability, flexibility, and resistance to volumetric expansion. These hoses also offer a long service life and are capable of being coupled to fittings in a manner that prevents fuel from escaping.

The subject invention more specifically discloses a curb pump hose comprising: (a) a tube layer, wherein the tube layer is comprised of a first nitrile rubber having an acrylonitrile content which is within the range of about 28 weight percent to about 50 weight percent, and wherein the tube layer is comprised of a third nitrile rubber which includes at least one fluorothermoplastic adhesion promoting agent; (b) a barrier layer which is situated over the tube layer, wherein the barrier layer is comprised of a fluorothermoplastic; (c) a friction layer which is situated over the barrier layer, wherein the friction layer is comprised of a second nitrile rubber having an acrylonitrile content which is within the range of about 28 weight percent to about 50 weight percent, and wherein the friction layer is further comprised of the third nitrile rubber which includes at least one fluorothermoplastic adhesion promoting agent; (d) a reinforcement layer which is situated over the friction layer, wherein the reinforcement layer is comprised of braided steel wire, wherein the braided steel wire has a wire pack coverage which is within the range of about 30 percent to about 60 percent; and (e) a cover layer which is situated over the reinforcing layer, wherein the cover layer is comprised of a chlorinated polyethylene.

The present invention also reveals a curb pump hose comprising: (a) a tube layer, wherein the tube layer is comprised of a first nitrile rubber having an acrylonitrile content which is within the range of about 25 weight percent to about 50 weight percent; (b) a tie layer which is situated over the tube layer, wherein the tie layer is comprised of a third nitrile rubber which includes at least one fluorothermoplastic adhesion promoting agent; (c) a barrier layer which is situated over the tie layer, wherein the barrier layer is comprised of a fluorothermoplastic; (d) a friction layer which is situated over the barrier layer, wherein the friction layer is comprised of a second nitrile rubber having an acrylonitrile content which is within the range of about 15 weight percent to about 50 weight percent, and wherein the friction layer is further comprised of a third nitrile rubber which includes at least one fluorothermoplastic adhesion promoting agent; (e) a reinforcement layer which is situated over the friction layer, wherein the reinforcement layer is comprised of braided steel wire, wherein the braided steel wire has a wire pack coverage which is within the range of about 30 percent to about 60 percent; and (f) a cover layer which is situated over the reinforcing layer, wherein the cover layer is comprised of a chlorinated polyethylene.

BRIEF DESCRIPTION OF THE DRAWINGS

FIG. 1 is a cut-away view of a curb pump hose of this invention which illustrates the various layers therein.

FIG. 2 is a cut-away view of an alternative embodiment of the curb pump of this invention which includes a tie layer which is situated between the tube layer and the barrier layer.

DETAILED DESCRIPTION OF THE INVENTION

Figure 3:
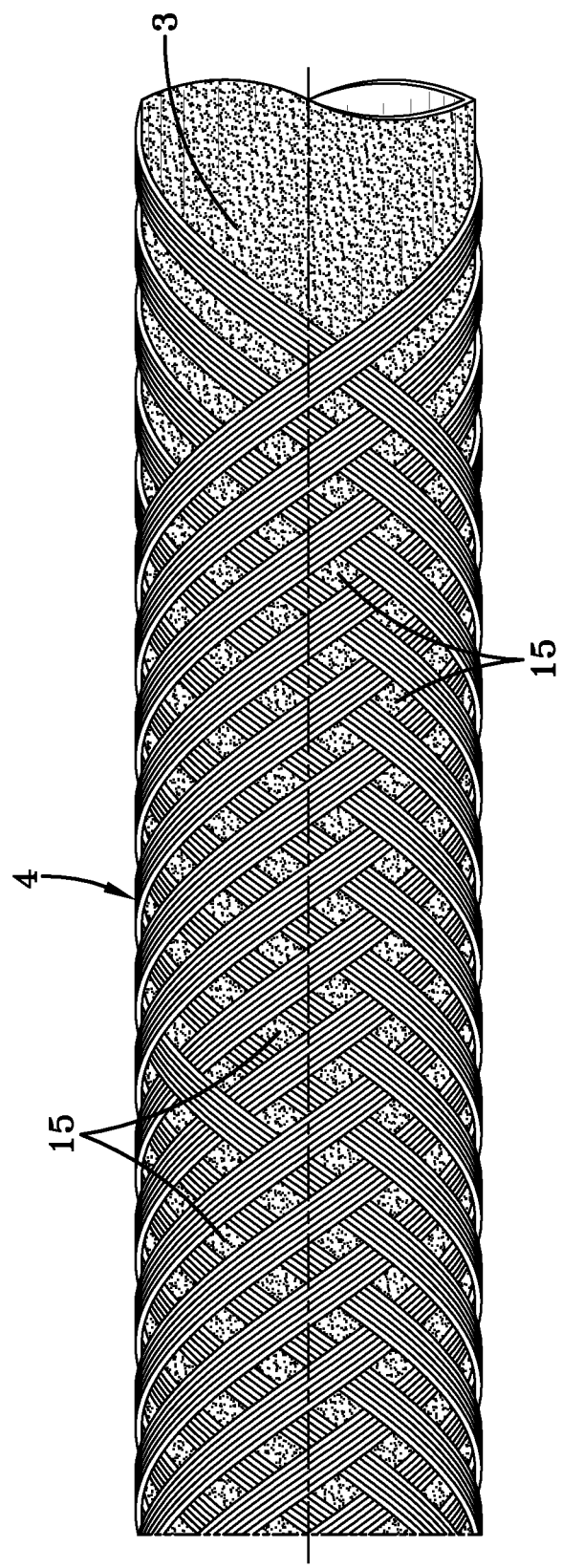
FIG. 3 illustrates a reinforcement layer having a wire braid pattern which is situated over a friction layer (the cover layer is not shown).

The curb pump hose 10 of the present invention is illustrated in FIG. 1 and typically has an inside diameter which is within the range of about 0.6 inch (15 mm) to about 1.2 inch (30 mm) and has an outside diameter of about 0.9 inch (23 mm) to about 1.8 inch (46 mm). For instance, the curb pump hose 5 can have an inside diameter of ⅝ inch (16 mm), ¾ inch (19 mm), ⅞ inch (22 mm), or 1 inch (25 mm). As a specific example, the curb pump hose can have in inside diameter of about 0.720 inch to 0.780 inch (18 mm to 20 mm) and an outside diameter of about 1.115 inch to 1.165 inch (28 mm to 30 mm). The hose 10 has a tube layer (core layer) 1, relative to the radial direction of the hose and the longitudinal hose axis. The tube layer 1 is the innermost layer of the hose. This tubular inner core layer defines the lumen 11 of the hose and is typically about 0.045 inch to 0.095 inch thick. The tube layer is more typically from 0.060 inch to 0.080 inch thick. The tubular inner core layer 1 is frequently referred to in the art as simply the "tube" or as simply as the "core."

The tube layer 1 is comprised of the first nitrile rubber having an acrylonitrile content which is within the range of about 28 weight percent to about 50 weight percent. The first nitrile rubber will typically have an acrylonitrile content which is within the range of about 30 weight percent to about 45 weight percent and will more typically have an acrylonitrile content which is within the range of about 35 weight percent to about 45 weight percent. In many cases the first nitrile rubber will have an acrylonitrile content which is within the range of about 38 weight percent to about 42 weight percent. The first nitrile rubber utilized in the tube layer is cured with a peroxide curative and a coagent which are employed at a level of about 4 to 10 phr (parts by weight per 100 parts by weight of rubber). The tube layer 1 can be void of fluorothermoplastic adhesion promoting agents.

For example, peroxides such as dicumyl peroxide, .α-α-bis(t-butylperoxide)diisopropylbenzene, benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy)hexane, 2,5-dimethyl-2,5-bis(t-butylperoxy)hexyne-3, and n-butyl 4,4-bis(t-butylperoxy)valerate can be employed in curing the nitrile rubber employed in the tube layer of the hose. The most preferred and commercially available peroxide curatives are Di-Cup® 40 KE and Vul-Cup® 40 KE from Arkema Inc. From 1 to about 10 parts of peroxide are generally utilized based on 100 parts of base polymer.

The nitrile rubber employed in the tube layer of the hose of this invention can also contain various additives in conventional or suitable amounts known to persons having ordinary skill in the art. Such additives may include, and are not limited to retardants to prevent an unduly quick cure, antioxidants, processing aids, reinforcing agents and fillers, such as carbon black, silica, other mineral fillers, lignin, and the like. Reinforcing fillers are typically utilized at a level which is within the range of 50 phr to 150 phr.

The first nitrile rubber used in the tube layer is further comprised of at least one fluorothermoplastic adhesion promoting agent. This adhesion promoting agent is comprised of (a) at least one metal oxide selected from the group consisting of magnesium oxide, calcium oxide, and hyrdrotalcite, and (b) an organo-onium salt, or a diamine salt. The metal oxide is typically present at a level within the range of 15 phr to 40 phr and is preferably present at a level within the range of 20 phr to 30 phr. The organo-onium salt is typically present at a level within the range of 3 phr to 8 phr with the diamine salt being present at a level within the range of 1 phr to 4 phr. It is preferred for the organo-onium salt to be present at a level within the range of 4 phr to 6 phr with the diamine salt being present at a level within the range of 2 phr to 3 phr. Additional nitrile rubber formulations that can be used in the tube layer are described in U.S. Pat. Nos. 6,270,901 and 6,482,522. The teachings of U.S. Pat. Nos. 6,270,901 and 6,482,522 are incorporated herein by reference for the purpose of describing various nitrile rubber formulations which can be utilized in the tube layer of the hoses of this invention.

A barrier layer 2 is positional outwardly from the tube layer 1. The barrier layer is comprised of a fluorothermoplastic and is typically from 0.003 inch to 0.017 inch thick. The barrier layer is more typically from 0.006 inch to 0.014 inch thick. The fluorothermoplastic is typically a semi-crystalline fluoropolymer having a peak melting temperature which is within the range of 100° C. to 275° C. and which is typically within the range of 120° C. to 250° C., as determined by ASTM D4591. In many cases the semi-crystalline fluoropolymer will have a peak melting temperature which is within the range of 130° C. to 200° C. It is normally preferred for the semi-crystalline fluoropolymer to have a peak melting temperature which is within the range of 140° C. to 185° C. It is typically more preferred for the semi-crystalline fluoropolymer to have a peak melting temperature which is within the range of 150° C. to 175° C. It is generally most preferred for the semi-crystalline fluoropolymer to have a peak melting temperature which is within the range of 160° C. to 170° C.

The semi-crystalline fluoropolymer will typically have a number average molecular weight which is within the range of 25,000 to 1,000,000, a hydrogen content of less than 5 weight percent, and a fluorine content which is within the range of 65 weight percent to 76 weight percent. The semi-crystalline fluoropolymer will typically be comprised of interpolymerized repeat units of hexafluoropropene, vinylidenedifluoride, and tetrafluoroethylene wherein the repeat units in the semi-crystalline fluoropolymer are distributed in an essentially random order. The hexafluoropropene repeat units are typically present at a level which is within the range of 50 weight percent to 70 weight percent, wherein the vinylidenedifluoride repeat units are present at a level which is within the range of 10 weight percent to 30 weight percent, and wherein the tetrafluoroethylene repeat units are present at a level which is within the range of 10 weight percent to 30 weight percent.

The hexafluoropropene repeat units in the semi-crystalline fluoropolymer are frequently present at a level which is within the range of 55 weight percent to 65 weight percent, wherein the vinylidenedifluoride repeat units are present at a level which is within the range of 15 weight percent to 25 weight percent, and wherein the tetrafluoroethylene repeat units are present at a level which is within the range of 15 weight percent to 25 weight percent. In many cases the hexafluoropropene repeat units are present in the semi-crystalline fluoropolymer at a level which is within the range of 57 weight percent to 61 weight percent, wherein the vinylidenedifluoride repeat units are present at a level which is within the range of 20 weight percent to 24 weight percent, and wherein the tetrafluoroethylene repeat units are present at a level which is within the range of 17 weight percent to 21 weight percent.

The semi-crystalline fluoropolymer will typically have a flexural modulus which is within the range of 180 MPa to 240 MPa and will preferably have a flexural modulus which is within the range of 200 MPa to 220 MPa, as determined by ASTM D790. The semi-crystalline fluoropolymer will also typically have a melt flow index which is within the range of 8 to 12, as determined at 265° C./5 kg by ASTM D1238. U.S. Pat. No. 6,489,420 describes various semi-crystalline fluoropolymers that can be utilized in the barrier layer 2 of the hoses of this invention. The teachings of U.S. Pat. No. 6,489,420 are incorporated herein for the purpose of describing such fluorothermoplastic polymers and techniques that can be employed in synthesizing such polymers.

The friction layer 3 is situated over and outwardly from the barrier layer 2 in the hose 10 of this invention. The friction layer is typically from 0.015 inch to 0.075 inch thick and will preferably be from 0.030 inch to 0.050 inch thick. The friction layer 3 will typically be in direct contact with the barrier layer 2. The friction layer 3 is comprised of a peroxide cured nitrile rubber and can be of the same formulation as is used in the tube layer 1. However, in some cases it may be desirable to employ a different nitrile rubber formulation in the friction layer. For instance, in some cases it may be desirable to employ a nitrile rubber having a lower level of acrylonitrile content.

The curb pump hoses of this invention have a reinforcing layer 4 which is situated over and outwardly from the friction layer 3. As shown in FIG. 2, the reinforcing layer 4 will typically be in direct contact with the friction layer 3. The reinforcing layer 4 is formed by braiding steel wires which are typically brass plated. For instance, the reinforcing layer 3 can be manufactured utilizing a braiding machine having 16 to 36 carriers (bobbins of wire), with 2 to 12 wire ends of 0.006 to 0.015 inch (0.15 mm to 0.38 mm) gage. As a more specific example, the reinforcing layer 3 can be manufactured utilizing a braiding machine having 24 carriers (bobbins of wire) with 6 wire ends of 0.012 inch (0.3 mm) gage wire. In any case, it is important for the braided steel wire used in the reinforcing layer 4 to have a wire pack coverage which is within the range of about 30 percent to about 60 percent. In other words, the wires of the reinforcement layer cover from 30 percent to 60 percent of the surface area of the friction layer 3 with the remaining 40 percent to 70 percent of the friction layer 3 being exposed through windows in the braid pattern. The braided steel wire will typically have a wire pack coverage which is within the range of about 32 percent to about 55 percent and will preferably have a wire pack coverage which is within the range of about 35 percent to about 50 percent. The braided steel wire will more preferably have a wire pack coverage which is within the range of about 40 percent to about 45 percent.

A cover layer 5 is positional outwardly from the reinforcement layer 4. The cover layer 5 is typically from 0.050 inch to 0.1 inch thick and is preferably 0.065 inch to 0.085 inch thick. The cover layer 5 is comprised of a chlorinated polyethylene which typically has a chlorine content which is within the range of 30 percent to 36 percent. It is preferred for the chlorinated polyethylene to have a chlorine content which is within the range of 34 percent to 36 percent.

In an alternative embodiment of this invention as illustrated in FIG. 2, the tube layer 1 is optimized for fuel resistance and adhesion to a tie layer 6 which is situated outwardly from the tube layer 1 and inwardly from the barrier layer 3. In this alternative design, the adhesion promoting agents are removed from the tube layer 1, thus optimizing its fuel resistance, volume swell, and adhesion to the rubber tie layer 6. This design can also lead to cost reduction.

While certain representative embodiments and details have been shown for the purpose of illustrating the subject invention, it will be apparent to those skilled in this art that various changes and modifications can be made therein without departing from the scope of the subject invention.

What is claimed is:

1. A curb pump hose comprising: (a) a tube layer, wherein the tube layer is comprised of a first nitrile rubber having an acrylonitrile content which is within the range of about 25 weight percent to about 50 weight percent, and wherein the tube layer is void of fluorothermoplastic adhesion promoting agents; (b) a tie layer which is situated over the tube layer, wherein the tie layer is comprised of a third nitrile rubber which includes at least one fluorothermoplastic adhesion promoting agent; (c) a barrier layer which is situated over the tie layer, wherein the barrier layer is comprised of a fluorothermoplastic, wherein the fluorothermoplastic is a semi-crystalline fluoropolymer which consists of interpolymerized repeat units of hexafluoropropene, vinylidenedifluoride and tetrafluoroethylene, wherein the repeat units in the semi-crystalline fluoropolymer are distributed in an essentially random order, and wherein the semi-crystalline fluoropolymer has a peak melting temperature which is within the range of 100° C. to 275° C.; (d) a friction layer which is situated over the barrier layer, wherein the friction layer is comprised of a second nitrile rubber having an acrylonitrile content which is within the range of about 15 weight percent to about 50 weight percent, wherein the friction layer is comprised of the third nitrile rubber which includes at least one fluorothermoplastic adhesion promoting agent; (e) a reinforcement layer which is situated over the friction layer, wherein the reinforcement layer is comprised of braided steel wire, wherein the braided steel wire has a wire pack coverage which is within the range of about 30 percent to about 60 percent; and (f) a cover layer which is situated over the reinforcing layer, wherein the cover layer is comprised of a chlorinated polyethylene; wherein the curb hose has a high level of resistance to permeation by gasoline and gasohol of less than 10 grams/m$^2$/day.

2. The curb pump hose as specified in claim 1 wherein the braided steel wire is brass plated steel wire having a wire pack coverage which is within the range of about 32 percent to about 55 percent.

3. The curb pump hose as specified in claim 1 wherein the braided steel wire has a wire pack coverage which is within the range of about 40 percent to about 45 percent.

4. The curb pump hose as specified in claim 1 wherein the semi-crystalline fluoropolymer has a number average molecular weight which is within the range of 25,000 to 1,000,000, wherein the semi-crystalline fluoropolymer has a hydrogen content of less than 5 weight percent, and wherein the semi-crystalline fluoropolymer has a fluorine content which is within the range of 65 weight percent to 76 weight percent.

5. The curb pump hose as specified in claim 1 wherein the hexafluoropropene repeat units are present at a level which is within the range of 50 weight percent to 70 weight percent, wherein the vinylidenedifluoride repeat units are present at a level which is within the range of 10 weight percent to 30 weight percent, and wherein the tetrafluoroethylene repeat units are present at a level which is within the range of 10 weight percent to 30 weight percent.

6. The curb pump hose as specified in claim 5 wherein the semi-crystalline fluoropolymer has a flexural modulus which is within the range of 180 MPa to 240 MPa, and wherein the semi-crystalline fluoropolymer has a melt flow index which is within the range of 8 to 12.

7. The curb pump hose as specified in claim 1 wherein the first nitrile rubber has an acrylonitrile content which is within the range of about 28 weight percent to about 45 weight percent and wherein the first nitrile rubber is cured with a peroxide curative.

8. The curb pump hose as specified in claim 1 wherein the first nitrile rubber is further comprised of at least one reinforcing filler including carbon black.

9. The curb pump hose as specified in claim 8 wherein the reinforcing filler further includes at least one mineral filler.

10. The curb pump hose as specified in claim 9 wherein the reinforcing filler is present at a level which is within the range of 50 phr to 150 phr.

11. The curb pump hose as specified in claim 1 wherein the fluorothermoplastic adhesion promoting agent in the third nitrile rubber in the tie layer is comprised of (a) at least one metal oxide selected from the group consisting of magnesium oxide, calcium oxide, and hyrdrotalcite, and (b) an organo-onium salt, or a diamine salt.

12. The curb pump hose as specified in claim 11 wherein the metal oxide is present at a level within the range of 15 phr to 40 phr; wherein the organo-onium salt is present at a level within the range of 3 phr to 8 phr; and wherein the diamine salt is present at a level within the range of 1 phr to 4 phr.

13. The curb pump hose as specified in claim 1 wherein the chlorinated polyethylene has a chlorine content which is within the range of 30 percent to 36 percent.

14. The curb pump hose as specified in claim 1 wherein the tube layer is from 0.045 inch to 0.095 inch thick; wherein the barrier layer is from 0.003 inch to 0.017 inch thick; wherein the friction layer is 0.015 inch to 0.075 inch thick; wherein the cover layer is 0.050 inch to 0.1 inch thick; and wherein said hose has an inside diameter which is within the range of 0.720 inch to 0.780 inch.

15. The curb pump hose as specified in claim 1 wherein said hose consists of the tube layer, the tie layer, the barrier layer, the friction layer, the reinforcement layer, and the cover layer.

16. The curb pump hose as specified in claim 1 wherein the fluorothermoplastic adhesion promoting agent included in the third nitrile rubber in the tie layer is comprised of (a) at least one metal oxide selected from the group consisting of magnesium oxide, calcium oxide, and hyrdrotalcite, and (b) an organo-onium salt, or a diamine salt.

* * * * *

UNITED STATES PATENT AND TRADEMARK OFFICE
CERTIFICATE OF CORRECTION

| | | |
|---|---|---|
| PATENT NO. | : 10,670,172 B2 | Page 1 of 1 |
| APPLICATION NO. | : 14/590301 | |
| DATED | : April 28, 2020 | |
| INVENTOR(S) | : Ramon Joseph DiMascio et al. | |

It is certified that error appears in the above-identified patent and that said Letters Patent is hereby corrected as shown below:

On the Title Page

Item (73) The Assignee should read CONTITECH USA, INC.

Signed and Sealed this
Tenth Day of June, 2025

Coke Morgan Stewart
*Acting Director of the United States Patent and Trademark Office*